US011475596B2

(12) United States Patent
Sabripour et al.

(10) Patent No.: US 11,475,596 B2
(45) Date of Patent: Oct. 18, 2022

(54) DEVICE, METHOD AND SYSTEM FOR ADJUSTING A CONFIGURATION OF A CAMERA DEVICE

(71) Applicant: MOTOROLA SOLUTIONS, INC., Chicago, IL (US)

(72) Inventors: Shervin Sabripour, Plantation, FL (US); Peter L. Venetianer, Chicago, IL (US); Pietro Russo, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 190 days.

(21) Appl. No.: 16/936,653

(22) Filed: Jul. 23, 2020

(65) Prior Publication Data

US 2022/0028115 A1 Jan. 27, 2022

(51) Int. Cl.
*G06T 7/80* (2017.01)
*G06T 7/207* (2017.01)
(Continued)

(52) U.S. Cl.
CPC ................ *G06T 7/80* (2017.01); *G06T 7/207* (2017.01); *G06T 7/74* (2017.01); *G06V 40/172* (2022.01);
(Continued)

(58) Field of Classification Search
CPC .. G06T 7/80; G06T 7/207; G06T 7/74; G06T 2207/30201; G06T 2207/30168; G06T 2207/30196; G06T 7/246; G06V 40/172; G06V 10/147; G06V 10/993; G06V 20/52; G06V 40/167; G07C 9/37; H04N 5/232; H04N 5/2351; H04N 5/2353; H04N 5/238; H04N 5/23219
See application file for complete search history.

(56) References Cited

U.S. PATENT DOCUMENTS

| | | | |
|---|---|---|---|
| 6,744,145 | B2 | 6/2004 | Chang et al. |
| 6,940,545 | B1 | 9/2005 | Ray et al. |

(Continued)

FOREIGN PATENT DOCUMENTS

| | | | |
|---|---|---|---|
| CN | 110633648 | A | 12/2019 |
| EP | 3748577 | A1 | 12/2020 |

(Continued)

OTHER PUBLICATIONS

PCT/US2021/041534, Device, Method and System for Adjusting a Configuration of a Camera Device, Jul. 14, 2021.

(Continued)

*Primary Examiner* — Fernando Alcon
(74) *Attorney, Agent, or Firm* — Perry + Currier, Inc.

(57) ABSTRACT

A device, method and system for adjusting a configuration of a camera device is provided. An example device is in communication with an example camera device having a configuration. The device receives an image sequence from the camera device. The device processes the image sequence to determine a predicted location of a target object identified in the image sequence based on movement of the target object in the image sequence. The device adjusts the configuration of the camera device based on a stored configuration of the camera device, the stored configuration indicative of conditions at the predicted location.

18 Claims, 9 Drawing Sheets

(51) Int. Cl.
*G06T 7/73* (2017.01)
*G07C 9/37* (2020.01)
*G06V 40/16* (2022.01)

(52) U.S. Cl.
CPC ...... *G07C 9/37* (2020.01); *G06T 2207/30201* (2013.01)

(56) References Cited

U.S. PATENT DOCUMENTS 7,574,016 B2 8/2009 Steinberg et al.
7,809,162 B2 10/2010 Steinberg et al.
10,282,852 B1 * 5/2019 Buibas .................... G06T 7/246
10,579,783 B1 * 3/2020 Aument ................. G06V 40/40
2006/0095539 A1 * 5/2006 Renkis ................ H04L 63/0428 709/217
2009/0196509 A1 8/2009 Farrer et al.
2012/0201426 A1 8/2012 Jasinski et al.
2013/0182900 A1 * 7/2013 Ishii ....................... H04N 5/378 382/103
2015/0296134 A1 10/2015 Cudak et al.
2016/0360101 A1 12/2016 Venetianer et al.
2018/0278834 A1 * 9/2018 Yu ...................... H04N 5/23216
2019/0043207 A1 * 2/2019 Carranza .............. G06V 40/172
2019/0213434 A1 7/2019 Zamfir et al.
2019/0261491 A1 8/2019 Abalos et al.
2019/0373186 A1 * 12/2019 Ortiz Egea ............ H04N 5/332
2020/0014846 A1 1/2020 Venetianer
2020/0126337 A1 * 4/2020 Friedli ................... G07C 9/257
2020/0322528 A1 * 10/2020 Guzman ............ H04N 5/23219
2021/0279475 A1 * 9/2021 Tusch ................. H04L 63/0861

FOREIGN PATENT DOCUMENTS

WO WO-2019140155 A1 * 7/2019 ........... A61B 5/0064
WO WO-2019151116 A1 8/2019

OTHER PUBLICATIONS

Park, Unsang, et al. "Face tracking and recognition at a distance: a coaxial and concentric PTZ camera system." IEEE transactions on information forensics and security 8.10 (2013): 1665-1677.

* cited by examiner 100
111
113
CONFIGURATION(S)
F(LOCATION, TIME, OBJECT)
627
PREDICTED LOCATION
CONFIGURATION
633
COMPUTING DEVICE
625
IMAGE SEQUENCE
627
PREDICTED LOCATION
QUALITY PARAMETER FAILS QUALITY TEST
CONFIGURATION
633
101
IMAGE SEQUENCE
625
CONFIG
120
103
109
105
107
625-2
625-1
117
119-2
123
115
117
119-1
115
123
121
121
121

DEVICE, METHOD AND SYSTEM FOR ADJUSTING A CONFIGURATION OF A CAMERA DEVICE

BACKGROUND OF THE INVENTION

Access points, such as doors, gates, and the like, may be maintained in a closed and/or locked state. Facial recognition of a mover (e.g. a moving person and/or a target object), and the like, may be used to authorize the mover to enter the access point; however obtaining a good quality image of a face of a mover may be challenging.

BRIEF DESCRIPTION OF THE SEVERAL VIEWS OF THE DRAWINGS

The accompanying figures, where like reference numerals refer to identical or functionally similar components throughout the separate views, together with the detailed description below, are incorporated in and form part of the specification, and serve to further illustrate embodiments of concepts that include the claimed invention, and explain various principles and advantages of those embodiments.

Figure 1:
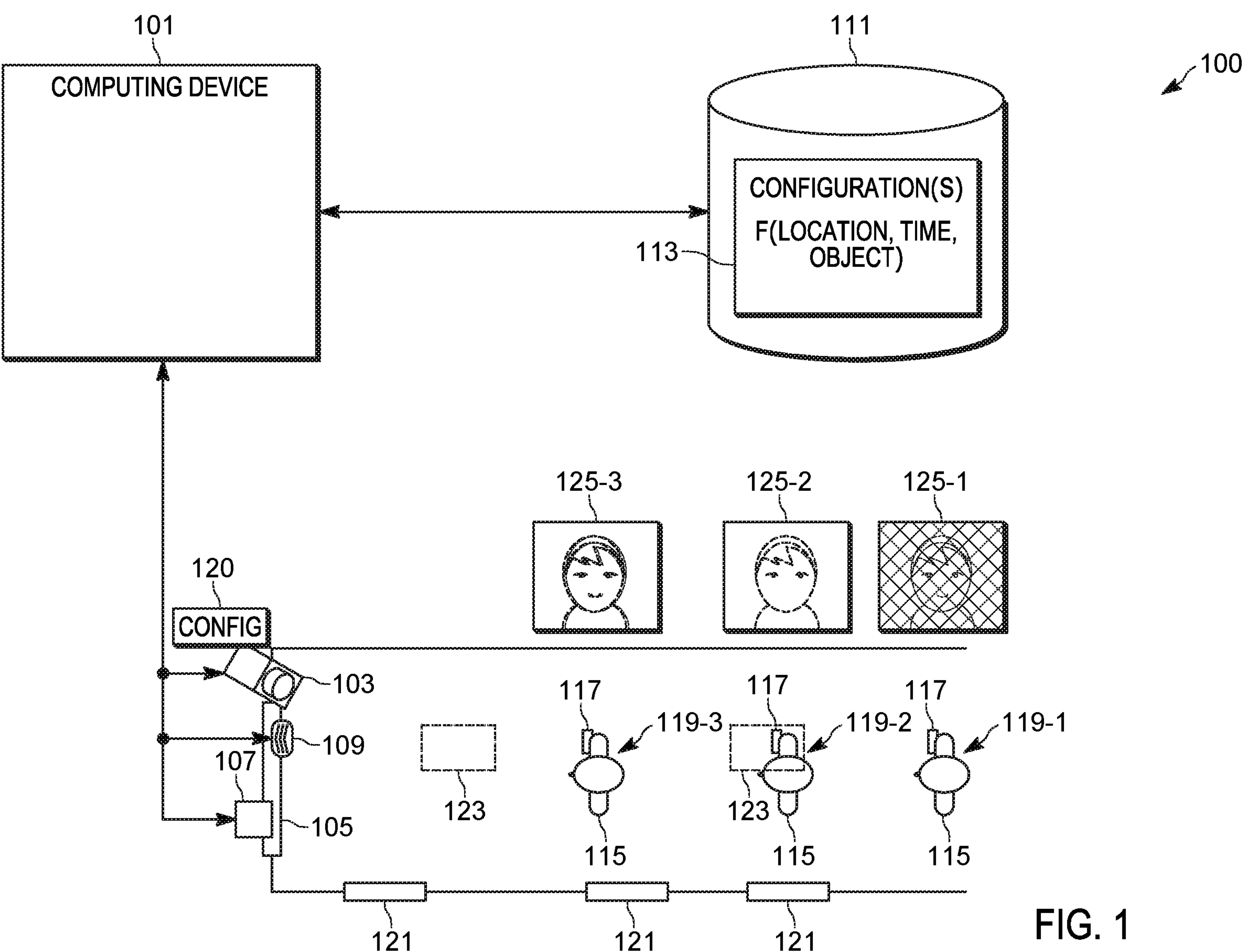
FIG. 1 is a system for adjusting a configuration of a camera device, in accordance with some examples.

Skilled artisans will appreciate that components in the figures are illustrated for simplicity and clarity and have not necessarily been drawn to scale. For example, the dimensions of some of the components in the figures may be exaggerated relative to other components to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Access points, such as doors, gates, and the like, may be maintained in a closed and/or locked state. Facial recognition of a mover (e.g. a moving person and/or a target object), and the like, acquired using a camera device proximal the access point, may be used to authorize the mover to enter the access point; however obtaining a good quality image of a face of a mover may be challenging. For example, as the mover moves towards the access point and/or relative to the camera device, lighting, velocity, skin tone, sweat on the mover, amongst other factors, can affect quality of images of the mover (e.g. a face of the mover) obtained by the camera device. For example, as a mover moves towards the access point, conditions at locations relative to the access point may affect image quality of images of the mover; for example, lights and/or windows, and the like, and/or time of day may affect the lighting on the mover (e.g. the lighting may become brighter and/or darker) which may affect image quality, however other conditions at the locations, such as conditions related to the mover, and/or conditions related to temperature, humidity, and the like, may also affect the images.

Hence, according to the present specification, a device is provided that receives an image sequence from a camera device that is acquiring images according to a configuration and/or settings (e.g. a current shutter speed, aperture, sensitivity, white balance, dynamic range, and the like). The device processes the image sequence to predict a location of a target object identified in the image sequence. While such a target object may comprise a person, and the like, the target object may comprise any suitable target object, such as a vehicle, an autonomous vehicle and/or robot, and the like. The device may access a memory that includes stored configurations and/or stored settings of the camera device that is indicative of conditions at the predicted location (e.g. a configuration of the camera device adjusted for predicted lighting at the predicted location, and/or other conditions of the predicted location and/or other conditions predicted for the particular mover at the predicted location); in some examples, the stored configurations and/or stored settings may be based on, and/or comprise, a statistical model for configurations and/or settings of the camera device that predicts best configurations and/or settings of the camera device for acquiring good quality images at the predicted location (e.g. as determined using one or more quality parameters of images previously acquired at the predicted location, and the like). The device may adjust the configuration of the camera device based on the stored configuration to attempt to improve image quality of images acquired at the predicted location. The images may be used to open and/or unlock the access point, and/or perform any other hardware based process including, but not limited to, storing the images at a memory, and the like. In particular examples, the device may further adjust a configuration of the camera device to better detect a face and/or another portion of a mover and/or target object.

An aspect of the present specification provides a method comprising: receiving, at a computing device, an image sequence from a camera device having a configuration; processing, at the computing device, the image sequence, to determine a predicted location of a target object identified in the image sequence based on movement of the target object in the image sequence; and adjusting, at the computing device, the configuration of the camera device based on a stored configuration of the camera device, the stored configuration indicative of conditions at the predicted location.

Another of the present specification provides a device comprising: a controller in communication with a camera device having a configuration, the controller configured to: receive an image sequence from the camera device; process the image sequence to determine a predicted location of a target object identified in the image sequence based on movement of the target object in the image sequence; and adjust the configuration of the camera device based on a stored configuration of the camera device, the stored configuration indicative of conditions at the predicted location.

Attention is directed to FIG. 1, which depicts an example system 100 for adjusting a configuration of a camera device. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks.

The system 100 comprises a computing device 101 (e.g. hereafter referred to interchangeably as the device 101) which is in communication with: a camera device 103 mounted adjacent a controlled access point 105 (e.g. hereafter referred to interchangeably as the access point 105), an access control mechanism 107, a reader device 109, and a memory 111 storing one or more predetermined configurations 113 of the camera device 103. As depicted, the camera device 103 is configured to image a region adjacent the access point 105; in particular, the camera device 103 may be mounted and/or located adjacent the controlled access point 105. However, the camera device 103 may be located in any other suitable position to image a region adjacent the access point 105.

As depicted, a mover 115 carrying a mobile device 117 is approaching the access point 105, within a field-of-view of the camera device 103, and is depicted from a top view at three locations 119-1, 119-2, 119-3, relative to the camera device 103. The locations 119-1, 119-2, 119-3 are interchangeably referred to hereafter, collectively, as the locations 119 and, generically, as a location 119. It is understood that the locations 119 of the mover 115 represent a sequence in time (e.g. from location 119-1 to location 119-3) as the mover 115 moves towards the camera device 103 and that while the locations 119 are depicted as discrete, the mover 115 is generally moving non-discretely towards the camera device 103.

The camera device 103 is also understood to be acquiring images of the mover 115 in an image sequence, which is provided to the device 101, which may perform facial recognition, and the like on the images to identify the mover 115; such facial recognition may be used by the device 101 to determine whether or not to open and/or unlock the access point 105, for example via the access control mechanism 107, to allow the mover 115 to move through the access point 105, amongst other possibilities. As such, the access point 105 is understood to initially be in a first state that prevents access therethrough, for example and it is further understood that the device 101 may control the access control mechanism 107 to cause the access point 105 to be in a second state that allows access through the access point 105. However, controlling the access point 105 is only one example of a hardware-based process that the device 101 may implement in response to identifying, or not identifying, the mover 115 via images from the camera device 103. For example, the images may be used to alert a security device to the presence of the mover 115 (e.g. when the mover 115 is not identified), and/or the images may be stored at a memory as part of a security monitoring procedure, amongst other possibilities.

Regardless, it is generally important for the camera device 103 to acquire clear and/or "good" quality images of the mover 115, and/or a face of the mover 115, to perform such hardware-based processes, and the like. However, the camera device 103 may initially be acquiring images according to a configuration 120 stored at the camera device 103 that may or may not be sufficient for the camera device 103 to acquire clear and/or "good" quality images of the mover 115 and/or perform facial recognition using the images. The configuration 120 generally comprises, for example, values of settings and/or default settings and/or previous settings that a processor of the camera device 103 initially uses to acquire an image sequence. For example, the configuration 120 may include values for one or more of a shutter speed, an aperture, a sensitivity, a white balance, a dynamic range, and the like, amongst other possibilities, that a processor of the camera device 103 uses to acquire an image sequence.

However, conditions at the locations 119 may be different, and some conditions at the locations 119 may not be compatible with the configuration 120 and/or may result in respective images of an image sequence being acquired that are over-exposed, under-exposed, blurry, and/or generally of a quality where a face, and the like, of the mover 115 may not be identifiable in the images. For example, as depicted, the region through which the mover 115 is moving (e.g. a hallway in a building) includes windows 121 and overhead lights 123 (depicted in outline to show a location thereof), which may cause the lighting on the mover 115 to change at the different locations 119, and which may also change depending on a time of day, weather, time of year, and the like. Similarly, other conditions may vary between the locations 119, such as temperature and/or humidity, and/or actions and/or conditions of the mover 115 may cause conditions to vary between the locations 119.

To better illustrate the challenges of acquiring good quality images, three example images 125-1, 125-2, 125-3 of the mover 115, as acquired by the camera device 103 at respective locations 119-1, 119-2, 119-3 are depicted (the images 125-1, 125-2, 125-3 interchangeably referred to hereafter, collectively, as the images 125 and, generically, as an image 125). The images 125 are understood to be images of an image sequence (e.g. the images 125 form an image sequence, and/or an image sequence comprises the images 125), and while only three images 125 are depicted, the image sequence may comprise any suitable number of images 125. Furthermore, while each of the images 125 includes a face of the mover 115, and a portion of a body of the mover 115, it is understood that the images 125 may comprise any suitable portion of the mover 115 depending, for example, on a relative position of the mover 115 in the field of view of the camera device 103; for example, as depicted, as the mover 115 gets closer to the camera device 103 a head of the mover 115 may fill more of the images 125, and the like.

It is further understood that the images 125 may represent an image sequence acquired by the camera device 103 prior to the device 101 adjusting the configuration 120 thereof based on the one or more stored configurations 113.

As depicted, the image 125-1 is underexposed as at the location 119-1, there is no light (i.e. from the windows 121 and/or the lights 123) on the mover 115, and the aperture and/or shutter speed of the camera device 103, amongst other settings defined by the configuration 120, may be at values that result in such underexposure. Such underexposure is represented in the images 125 via patterns overlaid on the images 125.

However, the image 125-2 is overexposed (e.g., as indicated the mover 115 in the image 125-2 being shown in dashed lines), as, at the location 119-2, the mover 115 is illuminated by both a window 121 and a light 123; again, the aperture and/or shutter speed of the camera device 103, amongst other settings defined by the configuration 120, may be at values that result in such the image 125-2 being overexposed.

As depicted, the image 125-3 is not underexposed or overexposed, however the mover 115 in the image 125-3 is out-of-focus and/or blurry, (e.g., as indicated the mover 115 in the image 125-3 being shown in both solid lines and dashed lines), as at the location 119-3, the mover 115 may be illuminated in a manner compatible with certain settings (e.g. the aperture) of the camera device 103, defined by the configuration 120, but the shutter speed of the camera device 103, amongst other settings, may be at a value that results in the image 125-3 being out-of-focus and/or blurry (e.g. which may be due, at least in part, to a speed and/or velocity of the mover 115).

However, lighting is only one factor that may affect conditions at the locations 119. For example, in the image 125-2, a mouth of the mover 115 is not visible, which may be due to skin tone of the mover 115 and/or sweating of the mover 115 (e.g. over their upper lip, and the like) which, when combined with the lighting at the location 119-2, may result in the mouth of the mover 115 being obscured in the image 125-2.

However, any suitable conditions may exist at the location 119 which may affect the quality of the images 125 and which may hence affect whether or not a face of the mover 115 may be detected and/or recognized via facial detection and/or facial recognition.

To address this, as will be explained in more detail below, the device 101 is generally configured to determine a predicted location of a target object, such as the mover 115, identified in an image sequence from the camera device 103, based on movement of the target object in the image sequence; and adjust the configuration 120 of the camera device 103 based on the stored configuration 113 of the camera device 103, the stored configuration 113 indicative of conditions at the predicted location.

In some examples, the device 101 may be further configured to determine whether or not a portion of the target object used for authorization, and the like, is detected in images from the camera device 103 using, for example, confidence levels of detection, and the like. In a particular example, the device 101 may detect a body of the mover 115 in images from the camera device 103, but not the face of the mover 115 and adjust the configuration 120 of the camera device 103 to detect the face of the mover 115.

While present examples are described with respect to a target object comprising the mover 115 (e.g. a human being) other target objects may include, but are not limited to, vehicles and/or autonomous vehicles and/or robots, and the like, that may be detected and/or recognized in images of an image sequence from the camera device 103 to authorize access via the access point 105, and the like. For example, a vehicle and/or autonomous vehicle and/or robot, and the like, may include a visual identifier, such as a license plate, a barcode, a quick response (QR) code, and the like which may be identified in images from the camera device 103, and used to authorize and/or verify such a target object.

Furthermore, the one or more stored configurations 113 may comprise one or more statistical models of settings of the camera device 103 as a function of location which may result in better quality images and/or optimized images (e.g. as described in more detail below) of target objects at locations 119. As depicted, such one or more statistical models may also be a function of time (e.g. time of day, date etc.) and/or a function of a target object (e.g. by target object type (e.g. such gender, and/or a human vs. a vehicle, etc.) and/or of a particular target object (e.g. such as a specific mover, and the like)). As such, the one or more stored configurations 113 are depicted as a function F(Location, Time, Object), indicating that, when a location (and optionally a time and/or an object identifier is input into the function F(Location, Time, Object)), a configuration of the camera device 103 may be output from the function F(Location, Time, Object) that may be used to optimize images acquired when the target object is located at the location.

In some examples, the device 101 may be in communication with more than one camera device, for example at more than one access point; in these examples, the one or more stored configurations 113 may be for a plurality of camera devices and/or the function F(Location, Time, Object) may be adapted for more than one camera device. In these examples, a stored configuration 113 may be determined based on an identifier of a camera device (e.g. which may be received with images from a camera device and may include, but is not limited to, a network address, a Media Access Control (MAC) address, and the like).

For example, over time, as the camera device 103 acquires images of movers and/or target objects, the device 101 may evaluate quality of the images at different locations 119, based on any suitable quality test, as compared to configurations 120 of the camera device 103 that resulted in good quality images; such configurations 120 may be stored in the one or more configurations 113 at the memory 111, and/or used to generate and/or build statistical models of the configurations 113 of the camera device 103 as a function of location; the statistical models of the configurations 113 of the camera device 103 may also be a function of time (e.g. a function of location and time). Particular quality tests may evaluate whether or not images acquired at different locations 119 include faces of movers that result in successful facial recognition thereof.

Furthermore, the reader device 109 may be used to read an identifier of the mover 115 (and/or a target object), for example from the mobile device 117; as such, images of the mover 115 acquired by the camera device 103 may be specifically associated with the identifier of the mover 115, and a statistical model of the configurations 113 may be specifically generated for the mover 115 (e.g. based on images previously acquired of the mover 115). Put another way, images previously acquired of the mover 115 may be used by the device 101 to generate and/or build statistical models of the configurations of the camera device 103 as a function of location (e.g. and a function of time) that are particular to the mover 115, and the like and/or the function F(Location, Time, Object) may be adapted accordingly.

However, when a particular mover does not carry a mobile device, previously acquired images of the particular mover may be used to generate an identifier thereof (e.g. based on biometric data in the images) which may also be used to determine when images of the particular mover are acquired by the camera device 103, and to build a statistical model of the configurations for the particular mover. However, in these examples, it is understood that facial recognition of the particular mover has already occurred and hence the camera device 103 has already been adjusted at least once (e.g. as per the method described below with respect to FIG. 3) and/or the particular mover is identifiable in images from the camera device 103; in such examples, the images of the particular mover may be used to initiate and/or improve a statistical model of the configurations for a particular mover, which may be used to improve images of the particular mover after the particular mover is identified.

Details of components of the system 100 are next described.

The device 101 may comprise a computing device that is remote (e.g. as depicted) or local to the access point 105. For example, the device 101 may be combined with the combined camera device 103 (and/or the reader device 109, and/or a communication device, such as a display screen and/or a speaker/microphone, and the like), for example as an intercom mounted adjacent the access point 105. However, the device 101 may be remote from the camera device 103 and/or the access point 105 and may be configured to receive images from a plurality of camera devices (e.g. for a particular building, as part of a security system for the building) and adjust respective configurations thereof.

While the memory 111 is depicted as being separate from the device 101, the device 101 and the memory 111 may be combined. As depicted, the memory 111 is in form of a database, however, the memory 111 may be provide in any suitable format, and/or may be combined with a memory of the device 101.

As depicted, the camera device 103 may be mounted adjacent the access point 105, and the term "adjacent" may be understood to mean any position relative to the access point 105 which may enable the camera device 103 to image the mover 115 and/or any other suitable target object. Put another way, the term "adjacent" may be understood to mean any position relative to the access point 105 in which a field-of view of the camera device 103 is positioned to image the mover 115 and/or any other suitable target object approaching the access point 105. Hence, for example, the camera device 103 being mounted adjacent the access point 105 may include, but is not limited to, the camera device 103 being mounted on a wall and/or surface beside the access point 105, on a ceiling, and the like, above the access point 105, on a wall and/or surface across from the access point 105, and/or any other suitable wall and/or surface and/or ceiling.

The camera device 103 may comprise a digital camera, a video camera, and the like, that acquires electronic images, in an image sequence, periodically and/or in response to motion and/or objects being detected at the access point 105 (e.g. via a motion sensor and/or an object sensor, and the like, not depicted), and/or on demand, and/or in any other suitable manner.

The access point 105 may generally comprise a door, a double door, a gate, a portal, an entrance, a turnstile, an exit, and the like through which passage is electronically controlled via the access control mechanism 107. The access point 105 may be located at an entrance and/or an exit to a building and/or room and/or hallway, and the like, through which passage is electronically controlled. While the access point 105 is depicted as a physical barrier mechanism, the access point 105 may additionally and/or alternatively comprise any suitable non-physical barrier mechanism through which passage is controlled, for example, using electromagnetic fields, disorienting holograms, or another non-visible type of barrier mechanism that may be used prevent passage therethrough. In the depicted examples, the access point 105 comprises a single physical door, that may be electronically locked, unlocked, opened and/or closed; in particular, when the door is unlocked and/or opened, a mover may pass therethrough.

As such, the access control mechanism 107 may comprise any suitable access control mechanism including, but not limited to, an electronic lock, an electronic door opening/closing mechanism, an electronic gate opening/closing mechanism, and/or any combination of devices that provided the aforementioned non-visible types of barrier mechanisms. Regardless, it is understood that the access point 105 may initially be in a state that prevents access therethrough, for example by the mover 115.

However, in some examples, the access point 105 may be optional, and the camera device 103 may be mounted in building, and/or hallway and/or outdoors to monitor movers and/or target objects in a field-of-view thereof, for example for security purposes, and the like. It is hence understood that the camera device 103 may be mounted in any suitable location.

While not depicted, the mover 115 may be authenticated via biometric and/or authorization data, and the like, stored at the memory 111, which may include feature vectors, facial landmarks, and/or any other suitable biometric data, and the like, of the mover 115 which may have been previously determined (e.g. via an enrollment process). Images of the mover 115, from the camera device 103, may be processed by the device 101 to extract similar biometric data therefrom, such as feature vectors, and compared to stored biometric data to authenticate the mover 115, and the like, for example in a facial recognition process. When the system 100 is adapted to authenticate non-human target objects, authorization data may include, but is not limited to, an enrolled identifier of the target object (e.g. a license plate number and/or an identifier that may be coded into a barcode and/or QR code, and the like).

As depicted, the system 100 may further comprise the reader device 109 and the like, which, for example, may be integrated with the camera device 103 (and/or the device 101 when local to the access point 105) and/or located adjacent to the access point 105. As described above, the reader device 109 may "read" and/or receive and/or exchange an authorized token (which may include an identifier associated with the mover 115) with the mobile device 117 using any suitable wireless communication link including, but not limited to, Bluetooth™, near field communication (NFC), and the like. The mobile device 117 may hence include a mobile phone, an NFC card, and/or an access card, and the like, configured to communicate with the reader device 109 via the wireless communication link. The device 101 may use the reader device 109 to read an authorized token and/or identifier from the mobile device 117 and authenticate the authorized token, for example using authorization data, not depicted, but which may be stored at the memory 111, and which may be used to authenticate the mover 115, in conjunction with facial recognition, and the like.

Figure 2:
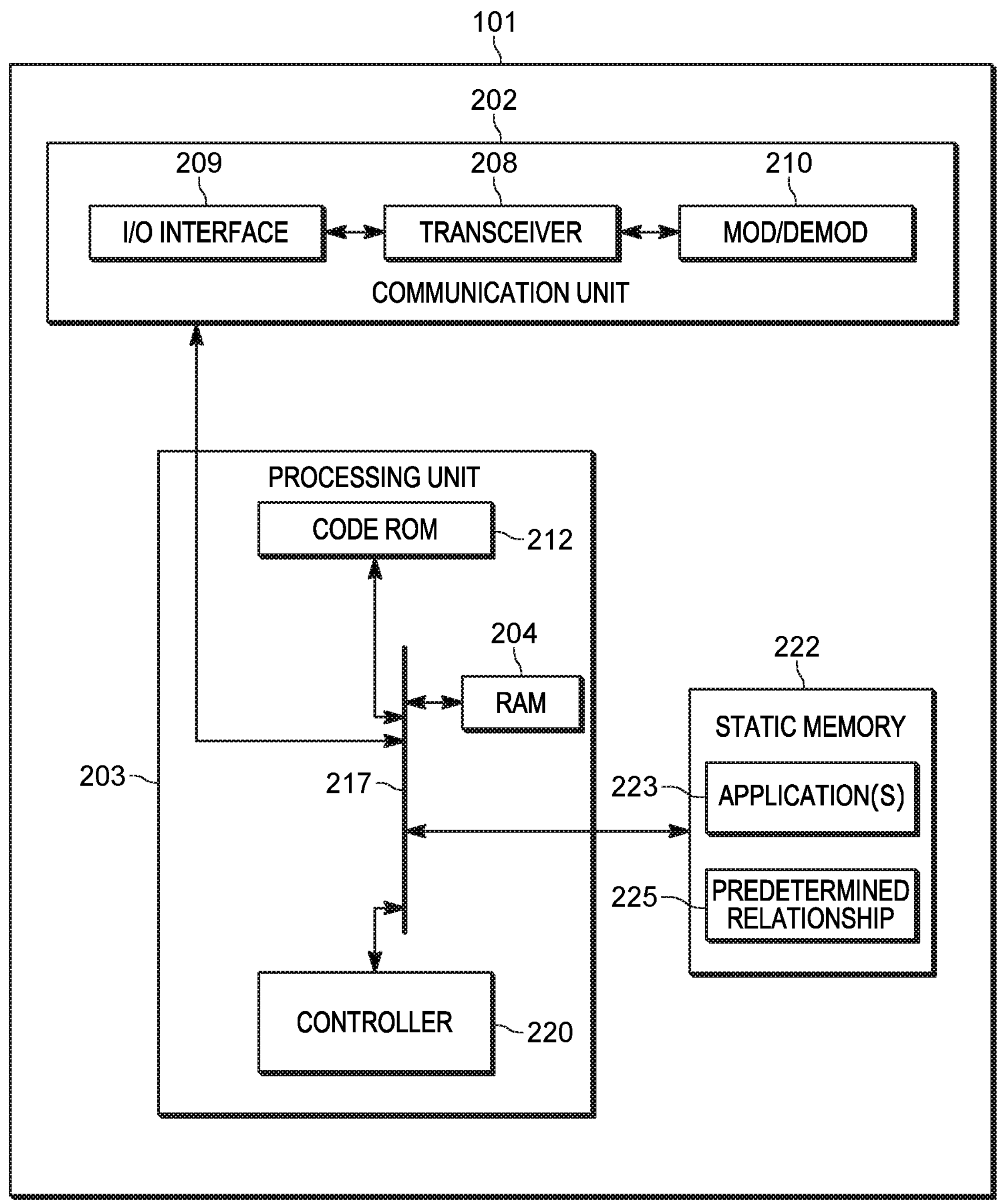
FIG. 2 is a device diagram showing a device structure of a device for adjusting a configuration of a camera device, in accordance with some examples.

Attention is next directed to FIG. 2 which depicts a schematic block diagram of an example of the device 101. In general, the device 101 may comprise a device remote to the access point 105 and/or the camera device 103, and/or a discrete device mountable to a surface adjacent an access point (e.g. the access point 105) and connectable (e.g. in a wired and/or wireless manner) to the access control mechanism 107 of the access point 105. As has already been described, in some examples, as depicted in FIG. 2, the device 101 may be combined with the camera device 103 and/or any other suitable device of the system 100, such as the reader device 109. The device 101 may further be in communication with the memory 111 which may be local or remote from the device 101, and in communication therewith via any suitable combination of wired and/or wireless communication links.

As depicted, the device 101 comprises: a communication unit 202, a processing unit 203, a Random-Access Memory (RAM) 204, one or more wireless transceivers 208 (which may be optional), one or more wired and/or wireless input/output (I/O) interfaces 209, a combined modulator/demodulator 210, a code Read Only Memory (ROM) 212, a common data and address bus 217, a controller 220, and a static memory 222 storing at least one application 223. Hereafter, the at least one application 223 will be interchangeably referred to as the application 223. Furthermore, while the memories 204, 212 are depicted as having a particular structure and/or configuration, (e.g. separate RAM 204 and ROM 212), memory of the device 101 may have any suitable structure and/or configuration.

While not depicted, the device 101 may include one or more of an input device and a display screen and the like.

As shown in FIG. 2, the device 101 includes the communication unit 202 communicatively coupled to the common data and address bus 217 of the processing unit 203.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communication unit 202 may include one or more wired and/or wireless input/output (I/O) interfaces 209 that are configurable to communicate with other components of the system 100. For example, the communication unit 202 may include one or more transceivers 208 and/or wireless transceivers for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP ($3^{rd}$ Generation Partnership Project) networks, a 5G network (e.g. a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 210.

The controller 220 may include ports (e.g. hardware ports) for coupling to other suitable hardware components of the system 100.

The controller 220 may include one or more logic circuits, one or more processors, one or more microprocessors, and/or the controller 220 may include one or more ASIC (application-specific integrated circuits) and one or more FPGA (field-programmable gate arrays), and/or another electronic device. In some examples, the controller 220 and/or the computing device 101 is not a generic controller and/or a generic device, but a device specifically configured to implement functionality for adjusting a configuration of a camera device. For example, in some examples, the computing device 101 and/or the controller 220 specifically comprises a computer executable engine configured to implement functionality for adjusting a configuration of a camera device.

The static memory 222 comprises a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the computing device 101 as described herein are maintained, persistently, at the memory 222 and used by the controller 220, which makes appropriate utilization of volatile storage during the execution of such programming instructions.

Figure 3:
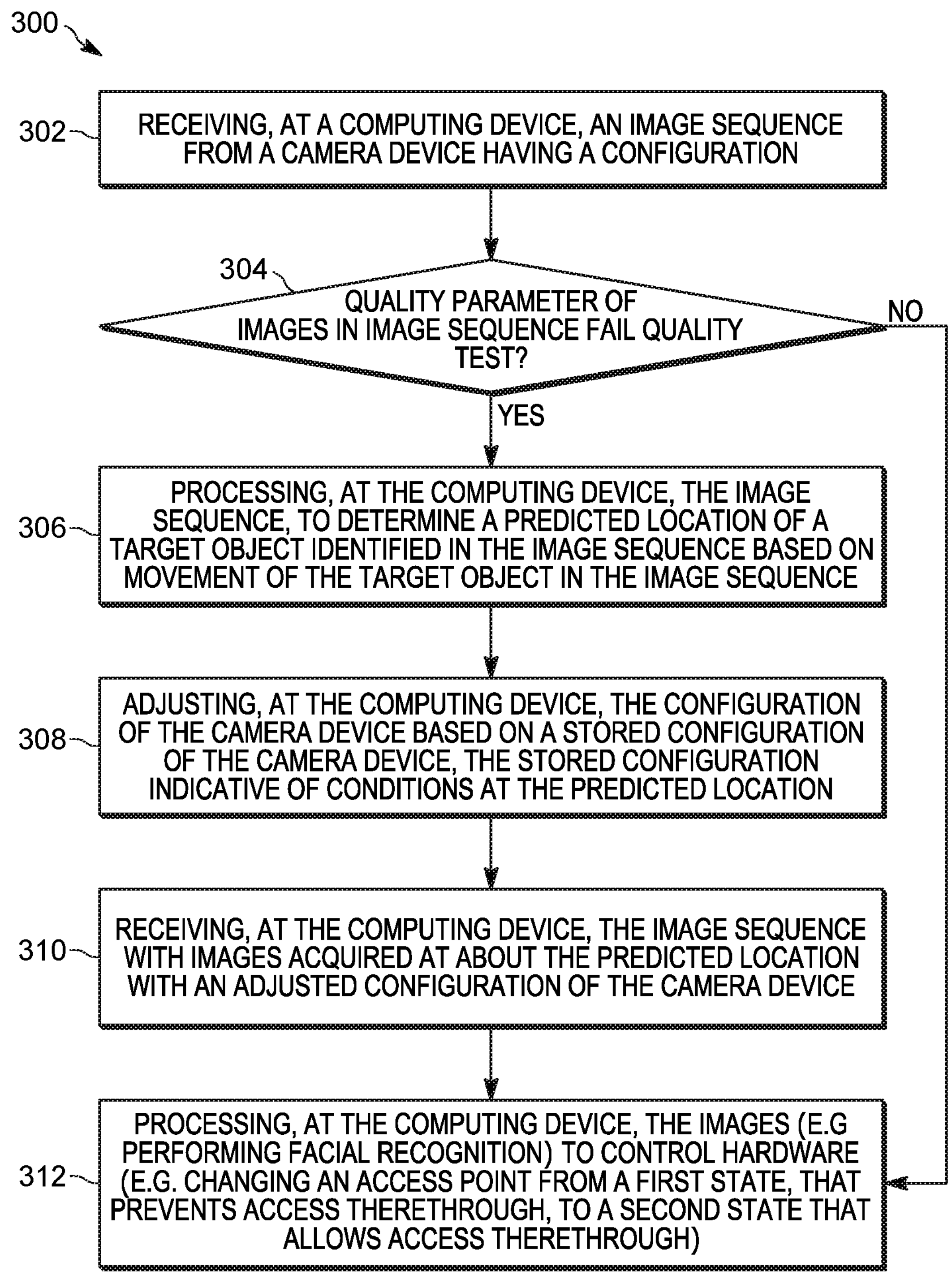
FIG. 3 is a flowchart of a method for adjusting a configuration of a camera device, in accordance with some examples.

In particular, the memory 222 stores instructions corresponding to the at least one application 223 that, when executed by the controller 220, enables the controller 220 to implement functionality for adjusting a configuration of a camera device, including but not limited to, the blocks of the methods set forth in FIG. 3.

In illustrated examples, when the controller 220 executes the one or more applications 223, the controller 220 is enabled to: receive an image sequence from a camera device having a configuration; process the image sequence, to determine a predicted location of a target object identified in the image sequence based on movement of the target object in the image sequence; and adjust the configuration of the camera device based on a stored configuration of the camera device, the stored configuration indicative of conditions at the predicted location.

As will be explained in more detail below, the memory 222 may further store and/or alternatively store, instructions corresponding to the at least one application 223 and/or a module thereof and/or another application, that, when executed by the controller 220, enables the controller 220 to implement functionality for adjusting a configuration of a camera device to detect different portions of a target object in images of an image sequence, including, but not limited to, the blocks of the method set forth in FIG. 4. In illustrated examples, when the controller 220 executes the one or more applications 223, the controller 220 is enabled to: receive, from a camera device first images in an image sequence; determine a first portion of the target object being detected in the first images; in response to determining, at the computing device, that a confidence level for a second portion of the target object detected in the first images is below a threshold confidence level, adjust, based on the first images, the configuration of the camera device to detect the second portion of the target object in second images in the image sequence received after the first images.

In other words, in some examples, in addition (and/or as an alternative) to adjusting a configuration of the camera device 103 to generally improve image quality of images from the camera device 103, the device 101 may be configured to adjust a configuration of the camera device 103 to better detect faces in images from the camera device 103; for example, a first portion of a target object may comprise a body of the mover 115 and a second portion of the target object may comprise a face of the mover 115. When the body is detected, but the face is not (e.g. determined using confidence levels), the device 101 may adjust the configuration of the camera device 103 until the face is detected (e.g. as also determined using confidence levels).

The application 223 may include programmatic algorithms, and the like, to implement functionality as described herein and which may include, but is not limited to, a programmatic facial determination and/or facial recognition engine.

Alternatively, and/or in addition to programmatic algorithms, the application 223 may include one or more machine learning algorithms to implement functionality as described herein. The one or more machine learning models and/or algorithms of the application 223 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some security environments. Any suitable machine learning algorithm and/or deep learning algorithm and/or neural network is within the scope of present examples.

In general, the device 101 may be further generally configured to determine a distance of the mover 115, and/or another target object, from the camera device 103. For example, as depicted, the memory 222 may further store a predetermined relationship 225 between a size of a body part of a mover (and/or another designated part of a target object) in a designator (e.g. a facial bounding box) and distance from the camera device 103. For example, the predetermined relationship 225 may comprise a function which defines a relationship between a distance from the camera device 103 and a body part (e.g. a face) and/or another portion of a target object in images from the camera device 103. Such a relationship may generally be predetermined, for example by measuring face size, and the like, of subjects at known real world distances and using polynomial regression, and the like, to determine a function therebetween, which may be stored at the predetermined relationship 225. In a particular example, the function of the predetermined relationship 225 may map face size (e.g. in pixel height, and/or pixel width, and/or pixel height*pixel width, and/or or pixel hypotenuse distance of a facial bounding box) to real world distance from the camera device 103. While designators referred to herein are described with respect to facial bounding boxes, it is understood that any suitable designator is within the scope of the present specification. For example a suitable designator may comprise any suitable consistent measurement of the mover 115, and/or another target object, in images from the camera device 103 (e.g. such as a head of the mover 115, a head outline of the mover 115, a profile (e.g. a side and/or three-quarter outline, and the like) of the of the mover 115, a profile outline of the mover 115, a head plus shoulders of the mover 115, a head plus shoulders outline of the mover 115, a full body of the mover 115, a full body outline of the mover 115, and/or any other suitable body part and/or outline thereof, of the mover 115).

As will further be described below, the device 101 may be further configured to (e.g. upon processing of the application 223 and/or a module thereof) determine one or more quality parameters of images, and whether or not the one or more quality parameters pass a quality test. Examples of quality tests are described in more detail below, but may include, but are not limited to, tests executed by the device 101 and/or the controller 220 which evaluate whether or not images include faces of movers that result in successful facial recognition thereof.

Attention is now directed to FIG. 3 which depicts a flowchart representative of a method 300 for adjusting a configuration of a camera device. The operations of the method 300 of FIG. 3 correspond to machine readable instructions that are executed by the device 101, and specifically the controller 220 of the device 101. In the illustrated example, the instructions represented by the blocks of FIG. 3 are stored at the memory 222 for example, as the application 223. The method 300 of FIG. 3 is one way in which the controller 220 and/or the computing device 101 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 220 and/or the device 101 receives an image sequence from the camera device 103 having the configuration 120. The present example will be described with respect to the image sequence including images of the mover 115 at a particular initial location, such as the image 125-1 of the mover 115 at the location 119-1. It is understood, however, that the image sequence may comprise a stream of images and/or video and/or video frames that continue to be received as the method 300 is implemented.

At a block 304, the controller 220 and/or the device 101 processes the image sequence, to determine a quality parameter of images in the image sequence, and determines whether or not the quality parameter passes or fails a quality test. For example, the controller 220 and/or the device 101 may determine whether the images 125 are overexposed, underexposed, whether the mover 115 in the images 125 is blurry or not blurry, whether or not a face of the mover 115 is clear enough for facial recognition to be performed on the face, and the like. However, in other examples, the block 304 may be optional, and the controller 220 may perform the remaining blocks of the method 300 without performing a quality test.

One example of a quality parameter may comprise a red-green-blue (RGB) histogram of an image. For example, the device 101 may determine colors of an image represented by the RGB histogram. In these examples, a quality test may comprise comparing the values of the RGB histogram to threshold and/or given RGB values, which may define a suitable color distribution, and when the values of the RGB histogram are outside the suitable color distribution, the quality parameter of the image may fail the quality test. However, any other suitable quality test and/or parameter is within the scope of the present specification; for example, images may be tested for blur and/or sharpness, and the like; similarly, a machine learning algorithm, and the like, may be trained to determine images which pass or fail a quality test. In some examples, a quality test may be based on feature vectors, and the like.

However, any suitable combination of one or more quantity parameters and quality tests is within the scope of the present specification including, but not limited to, machine learning based quality tests.

Furthermore, a plurality of quality tests may be performed on an image and, whether or not an image fails (or passes) one of the plurality of quality tests, a determination of a plurality of quality tests being passed or failed at the block 304 may depend on a weighted average of the quality tests. For example, a quality test based on feature vectors may be weighted higher than a quality test based on color. Hence, for example, when an image is underexposed, as represented by an RGB histogram, and/or a determined brightness and/or luminance value and/or color saturation of an image, but includes a feature vectors that are within a threshold variance, the image may pass the one or more quality tests.

When a quality parameter of the image fails (e.g. a "YES" decision at the block 304) a quality test (and/or a plurality of quality tests), at a block 306, the controller 220 and/or the device 101 processes the image sequence, to determine a predicted location of a target object identified in the image sequence based on movement of the target object in the image sequence.

For example, the controller 220 and/or the device 101 may identify a designator of the mover 115 in the images, such as a facial bounding box. Images that are received at different times (e.g. an image that is received and next and/or other images that are later received at determined and/or known times) indicate positions of the mover 115 at given times, and hence designators of such images may be used to determine an initial location 119 of the mover 115, and a speed and/or velocity of the mover 115; such data which may then be used to predict a location 119 at which the mover 115 will be located. The designators of images may also be used to determine direction vectors of the mover 115 to better predict a location 119. For example, the device 101 may determine, from the images 125-1, 125-2, the particular locations 119-1, 119-2, which may be used to predict the location 119-3.

In particular, the device 101 may furthermore determine a predicted location at a given time. For example, the camera device 103 may be acquiring images at a given rate, and/or performing the quality test may occur over a given time period. Hence, the device 101 may, for example determine that, at a determined speed of the mover 115, the mover 115 may be at a predicted location at a time that is about coincident with a time that the camera device 103 is to acquire an image (e.g. according to the given rate) and/or that at a time that follows the performance of the quality test.

However, any suitable process for predicting a location 119 of the mover 115 is within the scope of the present specification including, but not limited to, a machine learning based prediction of a location 119 of the mover 115 based on images in the image sequence.

At the block 308, the controller 220 and/or the device 101 adjusts the configuration of the camera device 103 based on the stored configuration 113 of the camera device 103. As has already been mentioned, the stored configuration 113 is generally indicative of conditions at the predicted location 119. Put another way, the stored configuration 113 may comprise one or more of a statistical model and a function that predicts configurations 120 of the camera device 103 for acquiring good quality images at the predicted location 119. Put yet another way, the stored configuration 113 may comprise a statistical model of settings of the camera device 103 as a function of distance from the camera device 103 and time.

At the block 308, for example, the controller 220 and/or the device 101 may input the predicted location 119 into the function F(Location, Time, Object) (e.g. as well as a current time, and the like and, if available, an identifier of the mover 115 and/or a target object, and the like, and/or a respective identifier of the camera device 103) to determine the stored configuration 113 of the camera device 103. As has already been described, the stored configuration 113 may be based, for example, on a statistical model represented by the function F(Location, Time, Object). Put another way, the method 300 may further comprise the controller 220 and/or the device 101 determining the stored configuration 113 based on the predicted location 119 and one or more of: a time of day, an identifier of the target object (e.g. an identifier of the mover 115 received via the reader device 109), and a respective identifier of the camera device.

The stored configuration 113 may be used to adjust the camera device 103 such that when the mover 115 reaches the predicted location 119, better quality images 125 of the mover 115 may be acquired by the camera device 103. For example, the device 101 may transmit a command to the camera device 103 to cause the camera device 103 to change the configuration 120 to a stored configuration 113 determined using the statistical model represented by the function F(Location, Time, Object), and the like. The camera device 103 may receive the command and update the configuration 120 accordingly such that, when the mover 115 reaches the predicted location 119 determined at the block 306, images of the mover 115 may be of better quality than the images initially acquired at the block 302.

For example, at the block 308, the controller 220 and/or the device 101 may adjust the configuration 113 of the camera device 103 by adjusting, at the camera device 103 (e.g. via a transmitted) command, one or more of: shutter speed; aperture; sensitivity; white balance; dynamic range; and/or any other suitable setting of the camera device 103.

At a block 310, the controller 220 and/or the device 101 may continue to receive the image sequence from the camera device 103, however images of the image sequence are acquired at about the predicted location 119 using an adjusted configuration of the camera device 103 and may comprise better quality images than were acquired with an initial configuration of the camera device (e.g. at the block 302) and/or images better suited for performing facial recognition.

Put another way, at the block 308, adjusting the configuration of the camera device 103 based on the stored configuration generally comprises adjusting the camera device 103 to an adjusted configuration; and, at the block 310, the controller 220 and/or the device 101 may receive, from the camera device 103, after adjusting the configuration of the camera device to the adjusted configuration, further images of the image sequence that include the target object at about the predicted location 119; wherein the further images, acquired using the adjusted configuration, are one or more of: a better quality than respective images acquired using the configuration (e.g. the initial configuration of the camera device 103 used to acquire images 125 at the block 302); and better suited for performing facial recognition than the respective images 125 acquired using the configuration.

At a block 312, the controller 220 and/or the device 101 may process the images 125 of the target object at about the predicted location 119 (e.g. as received at the block 310) to control hardware and/or implement any suitable hardware-based process based on the images 125 of the target object at the predicted location 119. In particular, the controller 220 and/or the device 101 may process images to perform facial recognition on the face of the mover 115 in the images 125 to determine whether or not, the mover 115 is authorized and/or verified, and the like, and implement a hardware-based process accordingly. It is understood that the images 125 used to perform facial recognition on the face of the mover 115 in the images 125 may be of a better quality and/or are better suited for facial recognition than the images 125 acquired at the block 302.

In a particular example, as previously described, the camera device 103 may be configured to image a region adjacent the access point 105, and the access point 105 may initially be in a first state that prevents access therethrough. Hence, at the block 310 and the block 312, the controller 220 and/or the device 101 may: receive, from the camera device 103, an image of the target object (e.g. the mover 115) determined to be at the predicted location 119; compare the image and/or biometric data extracted therefrom, to a stored image, and/or stored biometric data, to determine whether there is a match therebetween; and in response to determining the match therebetween, change the access point 105 from the first state to a second state that provides access therethrough. It is understood that the term “match” as used herein may include, but is not limited to, matches that are not exact but rather may meet a threshold confidence level, and the like. In particular, the device 101 may compare information extracted from the images from the camera device 103 with the stored biometric data, as described above, and assign a confidence level to the match, for example using any suitable algorithm and/or machine learning algorithms, and the like, and determine that the information extracted from the images from the camera device 103 matches the stored biometric data when the confidence level exceeds a threshold confidence level, and the like.

Returning briefly to the block 304, when the quality parameter passes the quality test (e.g. a “NO” decision at the block 304), the controller 220 and/or the device 101 may implement the block 312 (e.g. bypassing the blocks 308, 310) as, for example, the quality of the images 125 may be sufficient for performing facial recognition.

It is further understood that the block 302, the block 304, the block 306 the block 308, and the block 310 may be performed in a feedback loop to continuously and/or periodically, and the like, to evaluate images 125 of the image sequence of the camera device 103, and adjust the configuration 120 continuously and/or periodically, Furthermore, as the images 125 of the image sequence of the camera device 103 are evaluated, the stored configuration 113 (and/or a statistical model thereof) may also be updated, for example when an adjusted configuration 120 of the camera device 103 results in good quality images (e.g. images of the mover 115 at a particular location 119 that have a quality parameter that passes a respective quality test, at a particular time). Put another way, the method 300 may further comprise the controller 220 and/or the device 101: receiving, from the camera device 103, in the image sequence, an image of the target object determined to be at the predicted location 119; and updating the stored configuration 113 based on the image (e.g. in response to a quality parameter passing a respective quality test).

However, in some examples, the stored configuration 113 may not yet be generated. For example, when the method 300 initiates, the device 101 may not have yet built a statistical model. In these examples, the method 300 may further comprise the controller 220 and/or the device 101, in response to determining that the stored configuration 113 has not yet been generated (e.g. which may occur at and/or prior to, any of the block 302, the block 304, the block 306): adjusting the configuration 120 of the camera device 103 based on: the movement of the target object; and images 125 in the image sequence captured prior to the target object being located at the predicted location 119; receiving, from the camera device 103, in the image sequence, an image of the target object determined to be at the predicted location 119; and generating the stored configuration 113 based on the image.

For example, the device 101 may predict, from a speed and/or velocity of the target object (e.g. movement of the target object determined via images 125 in the image sequence captured prior to the target object being located at the predicted location 119), and a quality parameter of an image in an initial image sequence, settings of the camera device 103 that may improve an image of the target object at a predicted location (e.g. such that facial recognition may be better performed) and adjust the configuration of the camera device 103 accordingly. In a particular example, if an initial image in an image sequence is blurry, a shutter speed of the camera device 103 may be increased (e.g. based on a determined speed and/or velocity of the target object) to improve possibility of acquiring a sharp image at the predicted location 119 using, for example programmatic and/or machine learning algorithms and the like. Presuming the image acquired at the predicted location passes a quality test, the settings of the camera device 103 that resulted in the image passing the quality test may be used to initiate the statistical model of the stored configuration 113 (and/or such settings of the camera device 103 may be stored at the memory 111 to initiate and/or generate the stored configuration 113).

As has been previously described, the device 101 may be further configured to adjust the configuration 120 of the camera device 103 to better detect a portion of a target object, such as a face of the mover 115 and/or to better perform facial detection in images. As such, attention is now directed to FIG. 4 which depicts a flowchart representative of a method 400 for adjusting a configuration of a camera device to detect different portions of a target object in images of an image sequence. The operations of the method 400 of FIG. 4 correspond to machine readable instructions that are executed by the device 101, and specifically the controller 220 of the device 101. In the illustrated example, the instructions represented by the blocks of FIG. 4 are stored at the memory 222 for example, as the application 223. The method 400 of FIG. 4 is one way in which the controller 220 and/or the computing device 101 and/or the system 100 may be configured. Furthermore, the following discussion of the method 400 of FIG. 4 will lead to a further understanding of the system 100, and its various components.

Figure 4:
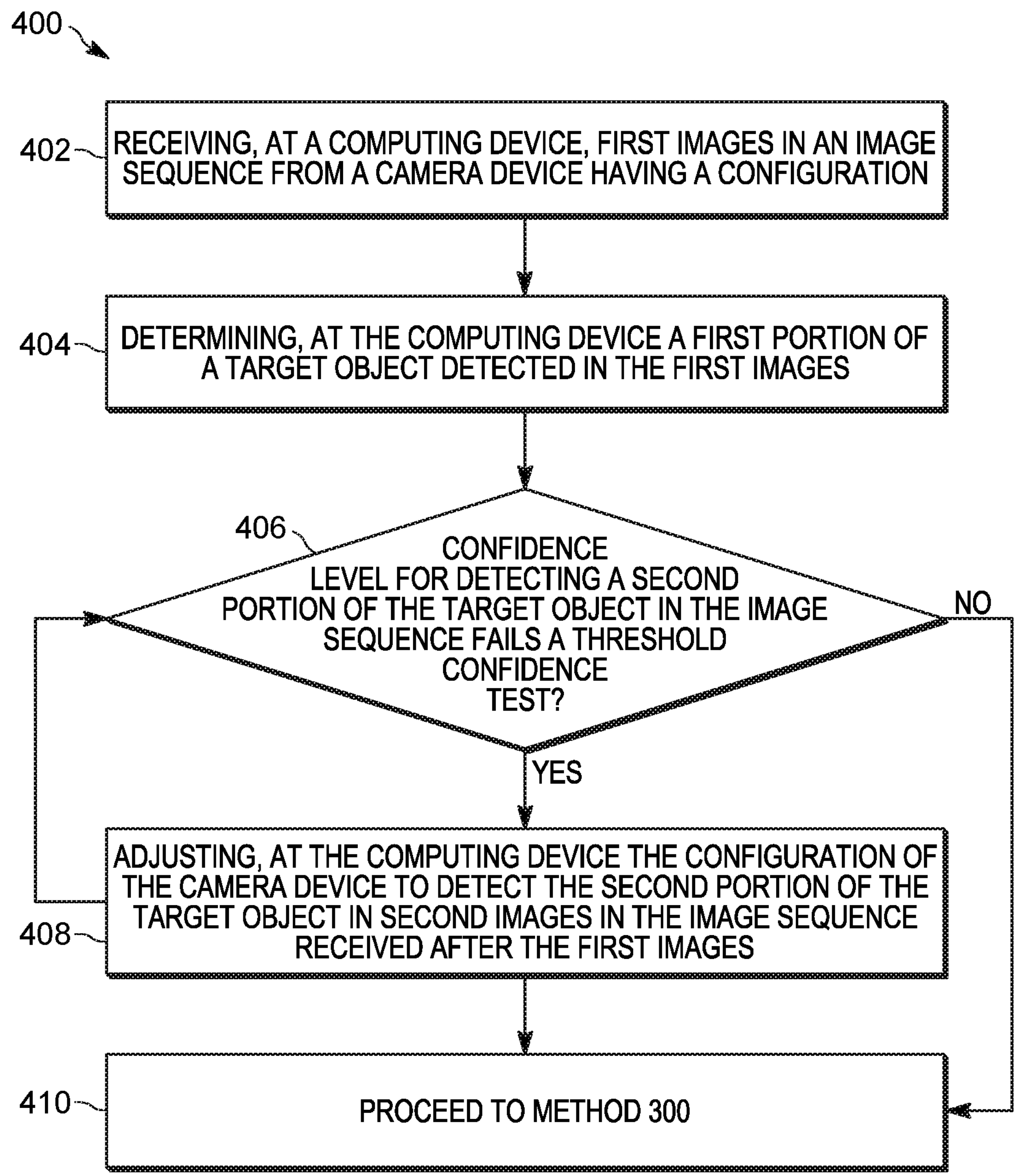
FIG. 4 is a flowchart of a method for adjusting a configuration of a camera device to detect different portions of a target object in images of an image sequence, in accordance with some examples.

The method 400 of FIG. 4 need not be performed in the exact sequence as shown and likewise various blocks may be performed in parallel rather than in sequence. Accordingly, the elements of method 400 are referred to herein as "blocks" rather than "steps." The method 400 of FIG. 4 may be implemented on variations of the system 100 of FIG. 1, as well.

In particular, the method 400 may occur prior to the method 300 being implemented.

At block 402, the controller 220 and/or the device 101 receives, from the camera device 103 (e.g. prior to the target object being at a predicted location 119 as in the method 300), first images in an image sequence. As has already been described, the camera device 103 has a configuration 120 and/or an initial configuration 120.

At block 404, the controller 220 and/or the device 101 determines a first portion of a target object detected in the first images. Such a determination may be performed using confidence levels, and the like. For example, first portion of a target object may comprise a body of the mover 115, and, at the block 404, the controller 220 and/or the device 101 may attempt to detect a body of a human in the first images and apply a confidence level to such a detection; when the confidence level exceeds a threshold confidence level, a "match" may occur and the controller 220 and/or the device 101 determines that a first portion of a target object has been detected in the first images. Such a comparison may alternatively be referred to as a threshold confidence test. However, in other examples, the target object may comprise a vehicle, and the like, and the first portion of such a target object may comprise a body of the vehicle. However, any suitable target object and/or first portion is within the scope of the present specification.

At the block 406, controller 220 and/or the device 101 determines a confidence level (e.g. different from a confidence level for the first portion) for detecting a second portion of the target object in the first images, and compares the confidence level to a threshold confidence level (e.g. different from a threshold confidence level for the first portion) and/or performs a threshold confidence test on the confidence level and/or the first images.

For example, second portion of a target object may comprise a face of the mover 115, and, at the block 406, the controller 220 and/or the device 101 may attempt to detect a face of a human being in the first images and apply a confidence level to such a detection; when the confidence level does not exceed a threshold confidence level, a failure of a threshold confidence test may occur. and the controller 220 and/or the device 101 determines that a second portion of a target object has not been detected in the first images. For example, the controller 220 and/or the device 101 may detect a body and/or a person in the first images, but not a face, as indicated at least by a corresponding confidence level being less than the threshold confidence level. In other examples, the controller 220 and/or the device 101 may detect a face but a corresponding confidence level of detecting the face may not exceed the threshold confidence level.

However, in other examples, the target object may comprise a vehicle, and the like, and the second portion of such a target object may comprise a license plate of the vehicle. However, any suitable threshold-based confidence test is within the scope of the present specification. However, any suitable target object and/or second portion is within the scope of the present specification and, in particular a second portion on which a respective detection may occur (e.g. facial detection, license plate detection, and the like).

In response to determining that a confidence level for the second portion of the target object detected in the image sequence, and/or the first images, fails a threshold confidence test (e.g. a "YES" decision at the block 406), at a block 408, the controller 220 and/or the device 101 adjusts, based on the first images, the configuration 120 of the camera device 103 to detect the second portion of the target object in second images in the image sequence received after the first images. For example, as described above, the first images may be processed to determine whether they are overexposed, underexposed, blurry, and the like, and the configuration 120 of the camera device 103 may be adjusted accordingly to better detect the second portion, such as a face of the mover 115.

The block 406 and the block 408 may be performed in a feedback loop until, at the block 406, the confidence level for the second portion of the target object detected in the image sequence passes a threshold confidence test (e.g. a "NO" decision at the block 406) such that at a block 410, the controller 220 and/or the device 101 may implement the method 300.

Hence, the method 400 may be implemented prior to the method 300 such that, in the method 300, a face of the mover 115 may be detected.

Figure 5:
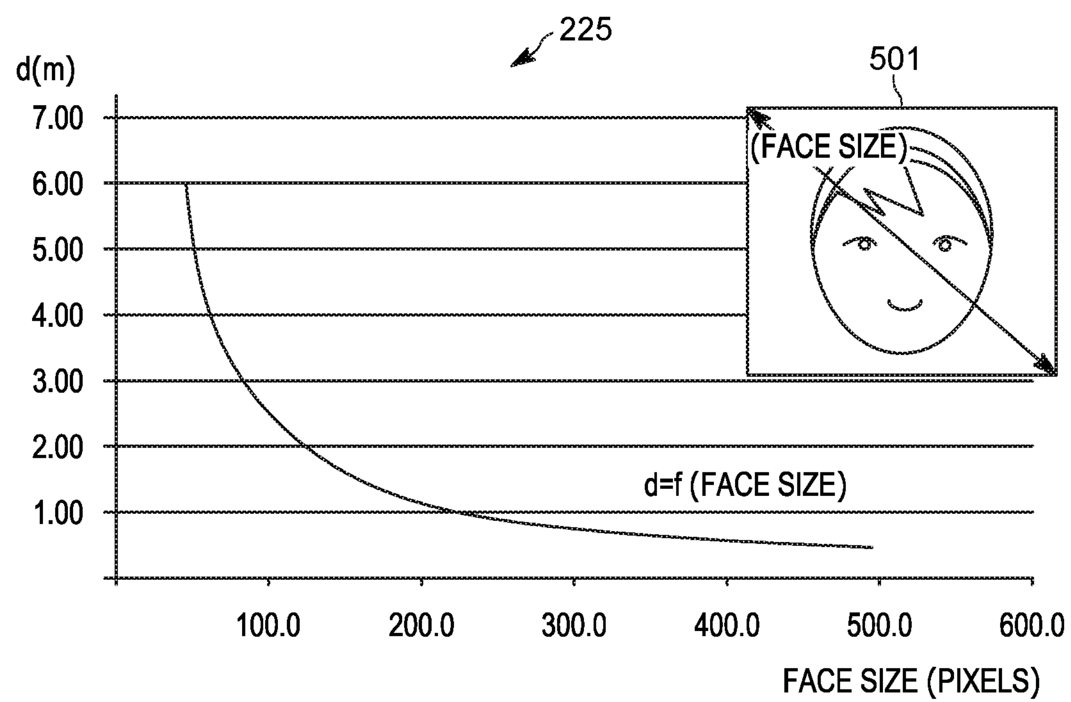
FIG. 5 depicts a particular example of a predetermined relationship between a designator (e.g. a facial bounding block), and a distance (e.g. a two-dimensional planar geospatial distance) from a camera device access point, shown in a graphical format, and example of a designator, in accordance with some examples.

Attention is next directed to FIG. 5 which depicts a particular example of the predetermined relationship data 225 shown in a graphical format, as well as an example of a designator 501. As depicted, the designator 501 comprises a facial bounding box of an image that includes a face of the mover 115, where the facial bounding box surrounds the face of the mover 115 in the image. While the entire image that includes the face of the mover 115 is not shown, it is nonetheless understood to be present. Furthermore, while the face of the mover 115 in the facial bounding box is a full frontal view of a face, the face of the mover 115 in the facial bounding box may include a side view, a three-quarter view, and/or any other suitable view of the face of the mover 115. In the particular example, the predetermined relationship data 225 indicates a relationship between a distance, d, (e.g. in meters) from the camera device 103 (e.g. a two-dimensional planar geospatial distance), and a face size of the face in the facial bounding box (e.g. a hypotenuse of the facial bounding box in pixels and/or the corner to opposite corner distance of the facial bounding box indicated by the arrow labelled "Face Size" in the designator 501). As depicted, the curve of the graphical format of the predetermined relationship data 225, as shown, may be expressed as a function d=f(Face Size), where "f" is a function that converts face size to distance. The function may be a reverse exponential function, and the like, as shown by the curve of the graphical format of the predetermined relationship data 225, with a smaller hypotenuse of the facial bounding box yielding larger distances, and vice versa.

Hence, the function d=f(Face Size) may be used at the block 306 to determine the predicted location of the mover 115 and/or another target object. Indeed, in such examples, the method 400 may be implemented such that the face of the mover 115 is detected in order to use the function d=f(Face Size).

When the target object comprises a vehicle, rather than a facial bounding block, the designator 501 may comprise a bounding box of an image that includes a body of the vehicle, and/or any other suitable portion of the vehicle.

Figure 6:
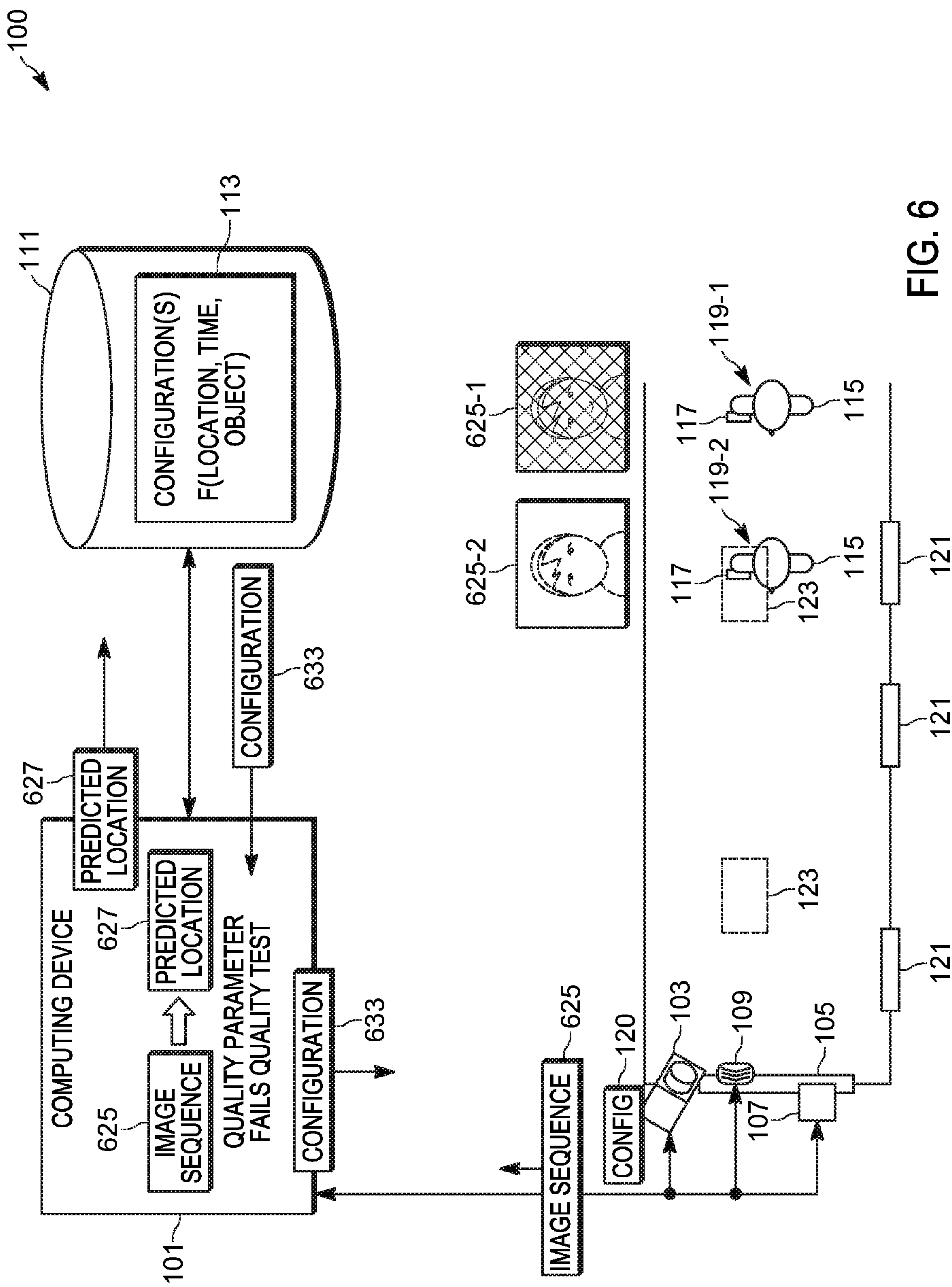
FIG. 6 depicts the system of FIG. 1 implementing a method for adjusting a configuration of a camera device, in accordance with some examples.
Figure 7:
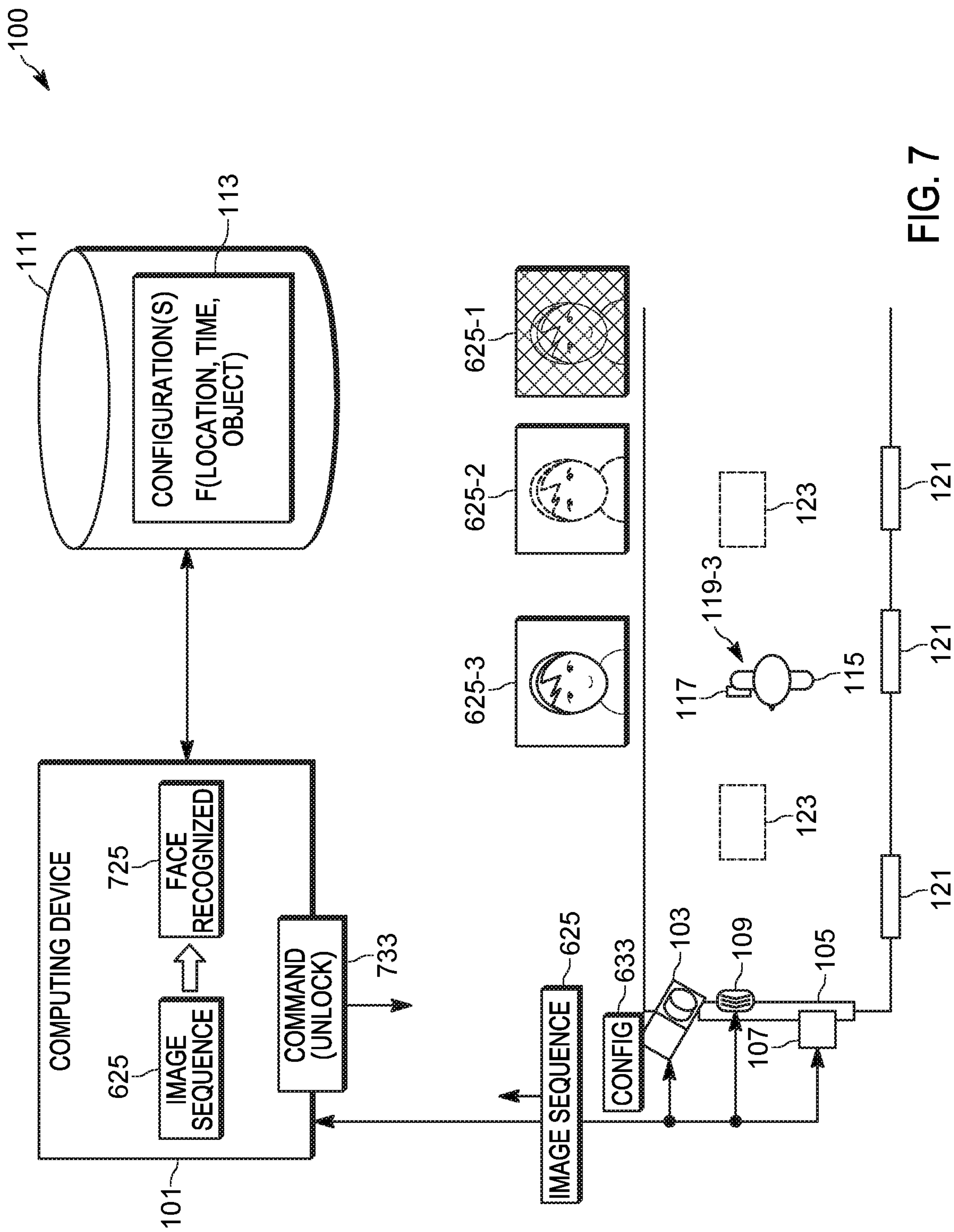
FIG. 7 depicts the system of FIG. 1 continuing to implement the method for adjusting a configuration of a camera device, in accordance with some examples.

Attention is next directed to FIG. 6 and FIG. 7 which depicts an example of the method 300. FIG. 6 and FIG. 7 are similar to FIG. 1, with like components having like numbers.

In FIG. 6, it is understood that the camera device 103 has acquired two images 625-1, 625-2 of the mover 115, at the locations 119-1, 119-2, respectively, which are received (e.g. at the block 302 of the method 300) at the device 101 in an image sequence 625. As depicted, the two images 625-1, 625-2 are respectively similar to the images 125-1, 125-2.

As depicted, a quality parameter of one or more of the images 625-1, 625-2 fails a quality test (e.g. a "NO" decision at the block 304), and the device 101 determines (e.g. at the block 306 of the method 300) a predicted location 627 using the images 625-1, 625-2. In the depicted example, it is understood that the predicted location 627 comprises the location 119-3.

The device 101 uses the predicted location 627 as input, for example, to the function F(Location, Time, Object) (e.g. also using a current time and, optionally, an identifier retrieved from the mobile device 117 via the reader device 109) to determine a stored configuration 633, for optimizing images of the image sequence 625 at the predicted location 627.

The device 101 adjusts (e.g. at the block 308 of the method 300) the configuration 120 of the camera device 103 by transmitting the configuration 633 to the camera device 103 (e.g. in a command, and the like).

With attention directed to FIG. 7, the camera device 103 receives the configuration 633 and a processor thereof adjusts the settings of the camera device 103 to the received configuration 633. As depicted in FIG. 7, in an image 625-3 acquired when the mover 115 is at the location 119-3 (e.g. the predicted location 627) a face of the mover 115 is generally clear and/or such that facial recognition may generally be performed thereon. For example, in FIG. 7, device 101 continues to receive the image sequence 625, that now includes the image 625-3, and performs facial recognition 725 on the image sequence 625; as depicted, the facial recognition 725 is successful, and the device 101 (e.g. at the block 310 of the method 300) transmits a command 733 to the access control mechanism 107 to cause the access control mechanism 107 to unlock, and the like, the access point 105.

Figure 8:
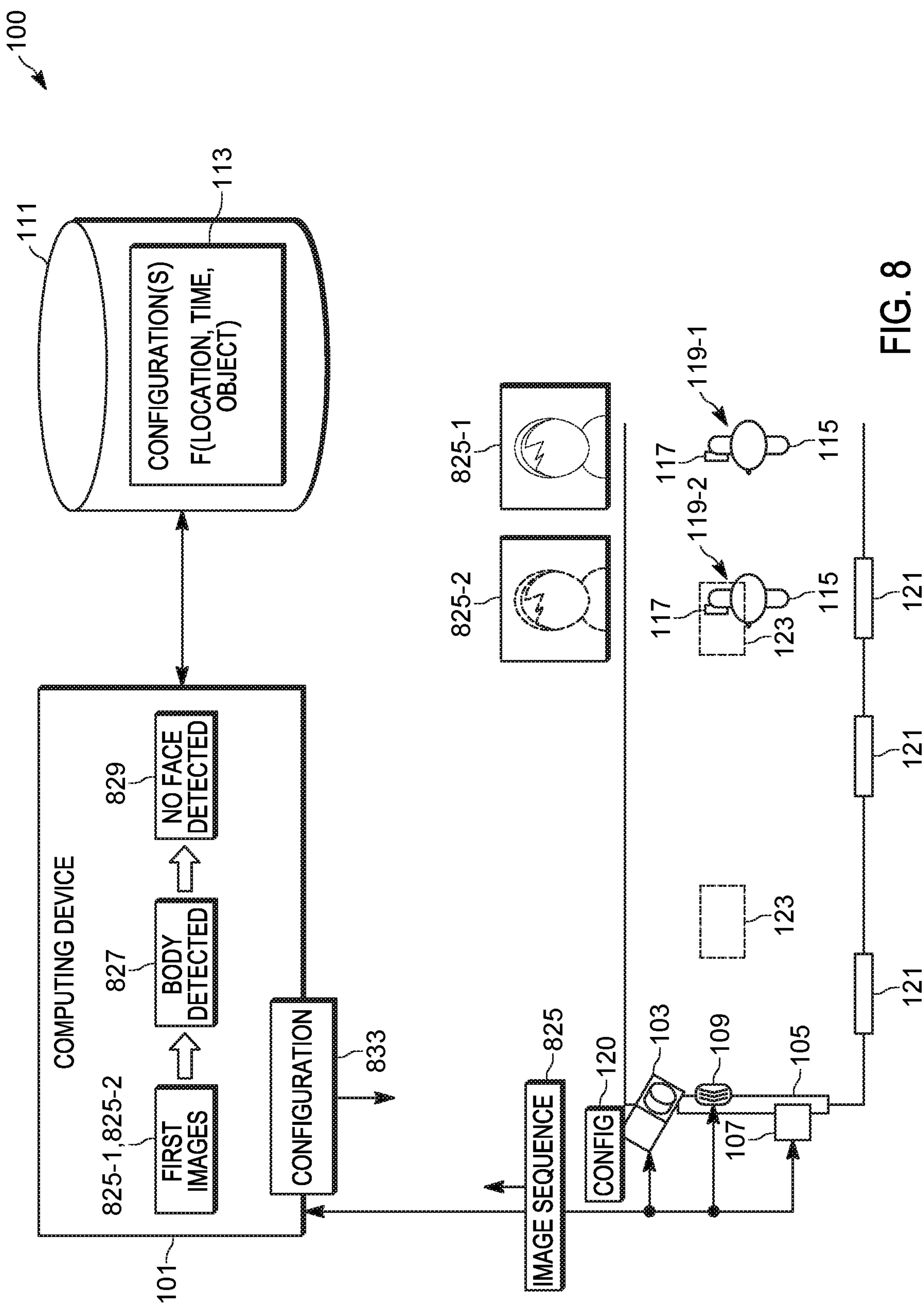
FIG. 8 depicts the system of FIG. 1 implementing a method for adjusting a configuration of a camera device to detect different portions of a target object in images of an image sequence, in accordance with some examples.
Figure 9:
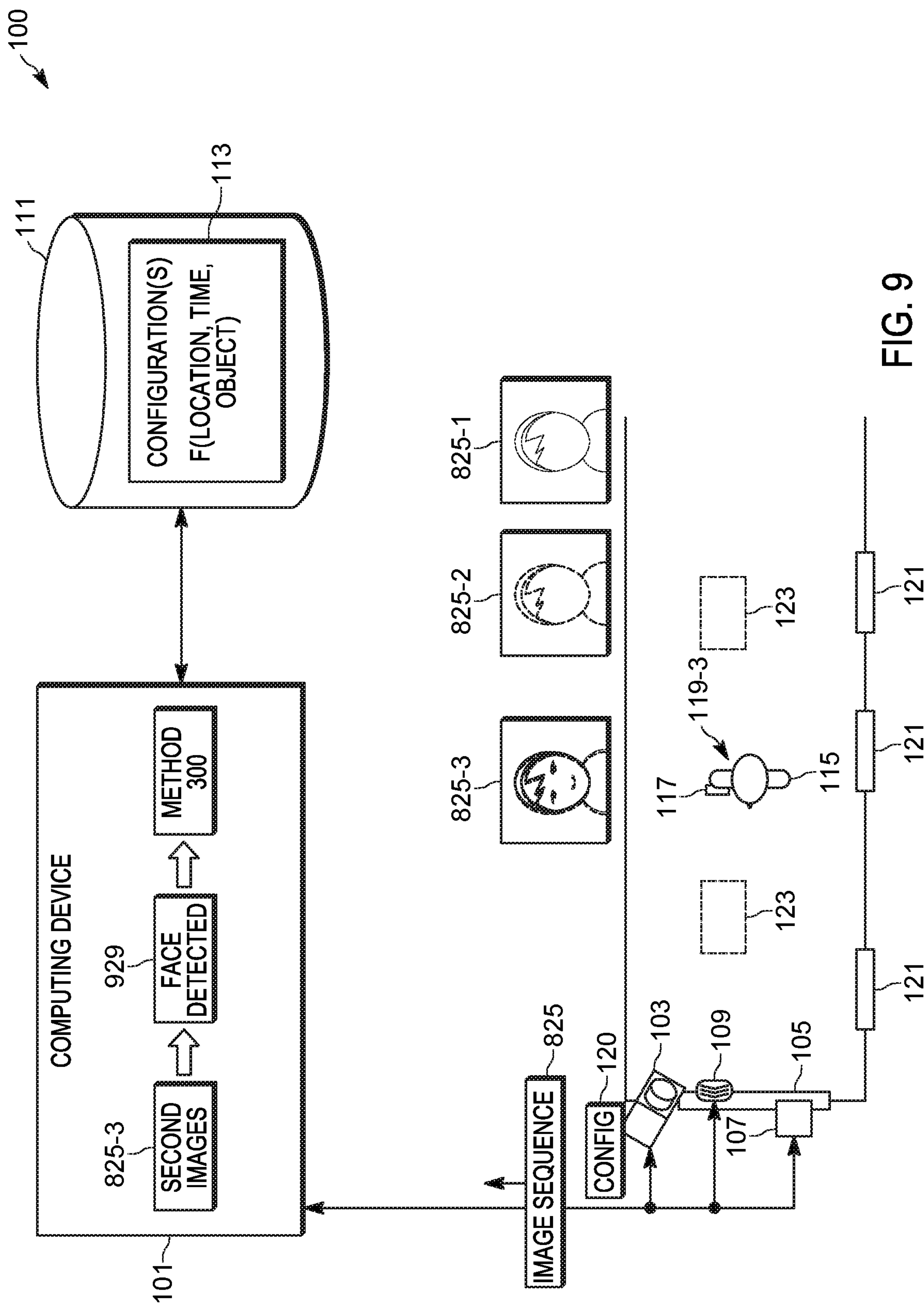
FIG. 9 depicts the system of FIG. 1 continuing to implement the method for adjusting a configuration of a camera device to detect different portions of a target object in images of an image sequence, in accordance with some examples.

Attention is next directed to FIG. 8 and FIG. 9 which depicts an example of the method 400. FIG. 8 and FIG. 9 are similar to FIG. 1, with like components having like numbers. While the method 400 is described with respect to the locations 119-1, 119-2, it is understood that the depicted example may occur prior to the example depicted in FIG. 6 and FIG. 7 and/or prior to the device 101 implementing the method 300.

In FIG. 8, it is understood that the camera device 103 has acquired first images 825-1, 825-2 of the mover 115, at the locations 119-1, 119-2, respectively, which are received (e.g. at the block 402 of the method 300) at the device 101 in an image sequence 825. As depicted, the first images 825-1, 825-2 are respectively similar to the images 125-1, 125-2, however the first images 825-1, 825-2 include a body of the mover 115, but not a face of the mover 115. Hence, facial detection and/or facial recognition cannot be performed on the first images 825-1, 825-2

As depicted, the device 101 determines 827 that a body (e.g. of the is detected in the first images 825-1, 825-2 (e.g. at the block 404 of the method 400), and has further determines 829 that a face is not detected in the first images 825-1, 825-2 (e.g. a "YES" decision at the block 406 of the method 400), for example according to a threshold confidence test, not depicted.

As such, the device 101 determines a configuration 833 to adjust the settings of the camera device 103 to better detect a face in images of the image sequence 825. The device 101 adjusts (e.g. at the block 408 of the method 300) the configuration 120 of the camera device 103 by transmitting the configuration 833 to the camera device 103 (e.g. in a command, and the like).

With attention directed to FIG. 9, the camera device 103 receives the configuration 833 and a processor thereof adjusts the settings of the camera device 103 to the received configuration 833. As also depicted in FIG. 9, in an image 825-3 (e.g. of second images acquired when the mover 115 is at the location 119-3) a face of the mover 115 is generally visible and/or the image 825-3 is such that facial detection may generally be performed thereon; however, images in the image sequence 825 may still be improved by implementation of the method 300. For example, as depicted, the image 825-3 is similar to the image 125-3 and the face in the image 825-3 is blurry. Regardless, device 101 continues to receive the image sequence 825, that now includes the image 825-3, and determines 929 that a face is detected. The device 101 may then implement the method 300 to continue to adjust the settings of the camera device 103 to better perform facial recognition, and the like, on images of the image sequence 825.

Indeed, the method 400 may generally be performed to better implement facial detection techniques on images from the camera device 103, and the method 300 may generally be performed to better implement facial recognition techniques on images from the camera device 103.

Hence, a first further aspect of the present specification provides a method comprising: receiving, at a computing device, from a camera device having a configuration, first images in an image sequence; determining, at the computing device a first portion of a target object detected in the first images; and in response to determining, at the computing device, that a confidence level for a second portion of the target object detected in the first images fails a threshold confidence test, adjusting, at the computing device, based on the first images, the configuration of the camera device to detect the second portion of the target object in second images in the image sequence received after the first images.

In some examples, in the method of the first further aspect, the target object comprises a person, the first portion comprises a body of the person, and the second portion comprises a face of the person.

In some examples, in the method of the first further aspect, the target object comprises a vehicle, the first portion comprises a body of the vehicle, and the second portion comprises a license plate of the vehicle.

In some examples, the method of the first further aspect further comprises: after detecting the second portion of the target object, receiving, at the computing device, from the camera device, third images acquired using an adjusted configuration of the camera device; processing, at the computing device, the third images to determine a predicted location of the target object identified in the third images based on movement of the target object in the image sequence; and again adjusting, at the computing device, the configuration of the camera device based on a stored configuration of the camera device, the stored configuration indicative of conditions at the predicted location. For example: adjusting, based on the first images, the configuration of the camera device to detect the second portion of the target object in the second images may comprise adjusting the configuration of the camera device to a first adjusted configuration; and again adjusting the configuration of the camera device based on the stored configuration of the camera device may comprise: adjusting the configuration of the camera device from the first adjusted configuration to a second adjusted configuration.

A second further aspect of the present specification provides a device comprising: a controller in communication with a camera having a configuration, the controller configured to: receive, from the camera device, first images in an image sequence; determine a first portion of a target object detected in the first images; and in response to determining that a confidence level for a second portion of the target object detected in the first images fails a threshold confidence test, adjust, based on the first images, the configuration of the camera device to detect the second portion of the target object in second images in the image sequence received after the first images.

In some examples, at the device of the second further aspect, the target object comprises a person, the first portion comprises a body of the person, and the second portion comprises a face of the person.

In some examples, at the device of the second further aspect, the target object comprises a vehicle, the first portion comprises a body of the vehicle, and the second portion comprises a license plate of the vehicle.

In some examples, the device of the second further aspect includes the controller being further configured to: after detecting the second portion of the target object, receive, from the camera device, third images acquired using an adjusted configuration of the camera device; process the third images to determine a predicted location of the target object identified in the third images based on movement of the target object in the image sequence; and again adjust the configuration of the camera device based on a stored configuration of the camera device, the stored configuration indicative of conditions at the predicted location. For example: the controller may be further configured to adjust, based on the first images, the configuration of the camera device to detect the second portion of the target object in the second images by adjusting the configuration of the camera device to a first adjusted configuration; and again adjust the configuration of the camera device based on the stored configuration of the camera device by: adjusting the configuration of the camera device from the first adjusted configuration to a second adjusted configuration.

It is further understood that the method of the first further aspect may further include any of the features described herein with respect to the method 400 and/or the method 300 and/or any other suitable features described herein. Similarly, the device of the second further aspect, and/or the controller thereof, may be further configured to implement any of the features described herein with respect to the method 400 and/or the method 300 and/or any other suitable features described herein.

As should be apparent from this detailed description above, the operations and functions of the computing device are sufficiently complex as to require their implementation on a computer system, and cannot be performed, as a practical matter, in the human mind. Computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any component(s) that may cause any benefit, advantage, or solution to occur or become more pronounced are not to be construed as a critical, required, or essential features or components of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of components does not include only those components but may include other components not expressly listed or inherent to such process, method, article, or apparatus. A component proceeded by "comprises . . . a", "has . . . a", "includes . . . a", "contains . . . a" does not, without more constraints, preclude the existence of additional identical components in the process, method, article, or apparatus that comprises, has, includes, contains the component. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising:

receiving, at a computing device, prior to a target object being at a predicted location, first images in an image sequence from a camera device having a configuration;

determining, at the computing device, a first portion of the target object being detected in the first images;

in response to determining, at the computing device, that a confidence level for a second portion of the target object detected in the first images fails a threshold confidence test, adjusting, at the computing device, based on the first images, the configuration of the camera device to detect the second portion of the target object in second images in the image sequence received after the first images;

processing, at the computing device, the image sequence, to determine the predicted location of the target object identified in the image sequence based on movement of the target object in the image sequence; and adjusting, at the computing device, the configuration of the camera device based on a stored configuration of the camera device, the stored configuration indicative of conditions at the predicted location.

2. The method of claim 1, wherein the adjusting the configuration of the camera device based on the stored configuration comprises adjusting the camera device to an adjusted configuration, and the method further comprises:

receiving, at the computing device, from the camera device, after adjusting the configuration of the camera device to the adjusted configuration, further images of the image sequence that include the target object at about the predicted location; wherein the further images, acquired using the adjusted configuration, are one or more of: a better quality than respective images acquired using the configuration; and better suited for performing facial recognition than the respective images acquired using the configuration.

3. The method of claim 1, further comprising:

processing, at the computing device, the image sequence, to determine a quality parameter of images in the image sequence, wherein the processing the image sequence to determine the predicted location of the target object occurs in response to determining that the quality parameter fails a quality test.

4. The method of claim 1, further comprising:

retrieving, at the computing device, from a memory, the stored configuration based on an identifier of one or more of: the camera device; a time of day; and the target object.

5. The method of claim 1, wherein the stored configuration is associated with one or more of; an identifier of the target object; a time of day; and the camera device.

6. The method of claim 1, further comprising:

receiving, at the computing device, from the camera device, in the image sequence, an image of the target object determined to be at the predicted location; and updating, using the computing device, the stored configuration based on the image.

7. The method of claim 1, the stored configuration comprises one or more of:

a statistical model;

a statistical model of settings of the camera device as a function of distance from the camera device and time; and a function that predicts configurations of the camera device for acquiring good quality images at the predicted location.

8. The method of claim 1, further comprising:

in response to determining that the stored configuration has not yet been generated, adjusting, at the computing device, the configuration of the camera device based on: the movement of the target object; and images in the image sequence captured prior to the target object being located at the predicted location;

receiving, at the computing device, from the camera device, in the image sequence, an image of the target object determined to be at the predicted location; and generating, at the computing device, the stored configuration based on the image.

9. The method of claim 1, wherein the camera device is configured to image a region adjacent an access point, the access point initially in a first state that prevents access therethrough, the method further comprising:

receiving, at the computing device, from the camera device, an image of the target object determined to be at the predicted location;

comparing, at the computing device, the image to a stored image to determine whether there is a match therebetween; and in response to determining the match therebetween, changing, at the computing device, the access point from the first state to a second state that provides access therethrough.

10. A device comprising:

a controller in communication with a camera device having a configuration, the controller configured to:

receive, prior to a target object being at a predicted location, first images in an image sequence from the camera device;

determine a first portion of the target object being detected in the first images;

in response to determining that a confidence level for a second portion of the target object detected in the first images fails a threshold confidence test, adjust, based on the first images, the configuration of the camera device to detect the second portion of the target object in second images in the image sequence received after the first images;

process the image sequence to determine the predicted location of the target object identified in the image sequence based on movement of the target object in the image sequence; and adjust the configuration of the camera device based on a stored configuration of the camera device, the stored configuration indicative of conditions at the predicted location.

11. The device of claim 10, wherein the controller is further configured to:

adjust the configuration of the camera device based on the stored configuration comprises by adjusting the camera device to an adjusted configuration; and receive, from the camera device, after adjusting the configuration of the camera device to the adjusted configuration, further images of the image sequence that include the target object at about the predicted location; wherein the further images, acquired using the adjusted configuration, are one or more of: a better quality than respective images acquired using the configuration; and better suited for performing facial recognition than the respective images acquired using the configuration.

12. The device of claim 10, wherein the controller is further configured to:

process the image sequence to determine a quality parameter of images in the image sequence, wherein processing the image sequence to determine the predicted location of the target object occurs in response to determining that the quality parameter fails a quality test.

13. The device of claim 10, wherein the controller is further configured to:

retrieve, from a memory, the stored configuration based on an identifier of one or more of: the camera device; a time of day; and the target object.

14. The device of claim 10, wherein the stored configuration is associated with one or more of; an identifier of the target object; a time of day; and the camera device.

15. The device of claim 10, wherein the controller is further configured to:

receive, from the camera device, in the image sequence, an image of the target object determined to be at the predicted location; and update the stored configuration based on the image.

16. The device of claim 10, the stored configuration comprises one or more of:

a statistical model;

a statistical model of settings of the camera device as a function of distance from the camera device and time; and a function that predicts configurations of the camera device for acquiring good quality images at the predicted location.

17. The device of claim 10, wherein the controller is further configured to:

in response to determining that the stored configuration has not yet been generated, adjust the configuration of the camera device based on: the movement of the target object; and images in the image sequence captured prior to the target object being located at the predicted location;

receive, from the camera device, in the image sequence, an image of the target object determined to be at the predicted location; and generate the stored configuration based on the image.

18. The device of claim 10, wherein the camera device is configured to image a region adjacent an access point, the access point initially in a first state that prevents access therethrough, and the controller is further configured to:

receive, from the camera device, an image of the target object determined to be at the predicted location;

compare the image to a stored image to determine whether there is a match therebetween; and in response to determining the match therebetween, change the access point from the first state to a second state that provides access therethrough.

* * * * *